United States Patent [19]
Krause

[11] Patent Number: 5,466,944
[45] Date of Patent: Nov. 14, 1995

[54] OPTICALLY-COUPLED DIFFERENTIAL LINE RECEIVER

[75] Inventor: Robert Krause, Menlo Park, Calif.

[73] Assignee: Siemens Components, Inc., Cupertino, Calif.

[21] Appl. No.: 129,639

[22] Filed: Sep. 30, 1993

[51] Int. Cl.⁶ .......................... H01F 40/14; G08B 17/12
[52] U.S. Cl. .......................... 250/551; 250/221; 250/238; 250/214 R; 250/559.29
[58] Field of Search .................... 250/205, 214 R, 250/221, 221.1, 222.1, 227.14, 227.21, 227.16, 231.1, 238, 551, 561

[56] References Cited

U.S. PATENT DOCUMENTS

| | | | |
|---|---|---|---|
| 4,591,709 | 5/1986 | Koechner et al. | 250/221 |
| 5,057,820 | 10/1991 | Markson et al. | 250/214 RC |
| 5,138,152 | 8/1992 | Botting | 250/227.16 |
| 5,206,500 | 4/1993 | Decker et al. | 250/222.1 |

Primary Examiner—William L. Sikes
Assistant Examiner—Fetsum Abraham
Attorney, Agent, or Firm—Joseph S. Codispoti

[57] ABSTRACT

An optically-coupled line receiver that handles multiple-state signals on data communications lines by using a differential circuit at the input.

18 Claims, 1 Drawing Sheet

5,466,944

OPTICALLY-COUPLED DIFFERENTIAL LINE RECEIVER

FIELD OF THE INVENTION

This invention generally relates to data communications interfaces. Specifically, the invention is directed to optically-coupled data communications interfaces.

BACKGROUND OF THE INVENTION

Data communication lines or channels can connect two data apparatus that are adjacent to each other or that are in separate geographic locations. As the trend of communicating between geographically-dispersed equipment continues, the risk increases of data communication lines accidentally contacting electrical power lines, and damaging equipment and injuring people. An additional increasing risk is the development of ground loops, and thus noisy data transmission, between such equipment. Electrical isolation of the data communication lines or channels can reduce the aforementioned risks.

Optocouplers are one class of devices used to transmit signal information between respective circuitry while maintaining electrical isolation therebetween. This is accomplished since optical signals, and not electrical signals, are passed between the light emitters and the photodetectors of an optocoupler, which are connected to respective portions of the circuitry. The size, cost and performance of optocouplers makes these devices preferable to implement electrical isolation for data communication lines and interfaces.

However, optocouplers are generally available only for handling single-ended signals, i.e., signals that are referenced to ground. In contrast, data communication lines and interfaces most often handle data that are in differential-driven and differential-received formats. For optically-coupled devices to handle a differential signal, additional external circuitry is required. It is desirable therefore to provide an optocoupler that will directly accept differential signals. It is also desirable to provide an optocoupler that provides an isolated data communications interface.

SUMMARY OF THE INVENTION

The aforementioned problems are obviated by the present invention which provides an optically-coupled differential line receiver. The receiver may comprise an input differential amplifier circuit capable of driving a light emitter; a light emitter, such as a light emitting diode ("LED"); and an output amplifier circuit. The input differential amplifier circuit may include a differential amplifier that controls a switched current source. The switched current source, in turn, drives the emitter as a function of the values of the differential signals received by the differential amplifier.

The output amplifier circuit may include a photodetector that drives an output amplifier in response to the emitter operation. Further, the output amplifier circuit may have either a single-ended or differential design.

By incorporating a differential signal detector and an LED drive within an electrical isolation device, differentially-coded data signals can be received, decoded and transmitted in one integrated operation.

BRIEF DESCRIPTION OF THE DRAWINGS

A more complete understanding of the present invention, as well as other objects and advantages thereof not enumerated herein, will become apparent upon consideration of the following detailed description and the accompanying drawings, wherein.

DETAILED DESCRIPTION

The devices described herein are based in part on the technology used in the Siemens® IL300 family of aluminum gallium arsenide (AlGaAs) linear optocouplers, discussed in the Siemens Optoelectronics Data Book 1993, pp. 5–115 through 5–122, and pp. 11–177 through 11–193. It should be understood that other devices can be used as well. Also, the optocouplers could be used with other types of electromagnetic radiation, such as ultraviolet light.

Figure 1:
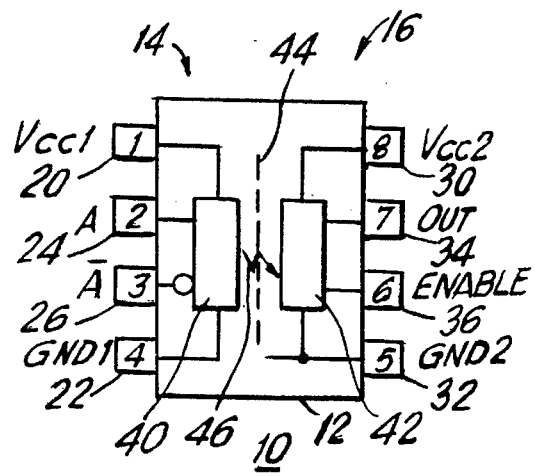
FIG. 1 is a schematic diagram of an optically-coupled differential line receiver constructed in accordance with the present invention.

An optically-coupled differential line receiver 10 constructed in accordance with the present invention is shown in the block schematic diagram of FIG. 1. The line receiver 10 is contained in a dual in-line package (DIP) 12, having eight pins, but any suitable packaging arrangement or device can be used. The receiver DIP 12 has two sides, an input side 14 and an output side 16.

The input side 14 of the receiver DIP 12 has a first voltage supply pin $V_{CC1}$ 20, a first ground pin $GND_1$ 22, and first and second differential data inputs 24, 26. The output side 16 of the receiver DIP 12 has a second voltage supply pin $V_{CC2}$ 30, a second ground pin $GND_2$ 32, a data output 34, and an enable output 36.

The line receiver 10 contained within the DIP 12 comprises an input differential amplifier circuit 40 and an optical differential output circuit 42 separated by an optical cavity 44, depicted symbolically by a dashed line. As described in detail below, optical radiation 46 generated by the input differential amplifier circuit 40 passes through the optical cavity 44 to the optical differential output circuit 42. The input differential amplifier circuit 40 is connected to the first voltage supply pin $V_{CC1}$ 20, the first ground pin $GND_1$ 22, and the first and second differential data inputs 24, 26. The differential output circuit 42 is similarly connected to the second voltage supply pin $V_{CC2}$ 30, the second ground pin $GND_2$ 32, the data output 34, and the enable output 36. Note that the optical cavity 44 may be any suitable light conducting medium.

Figure 2:
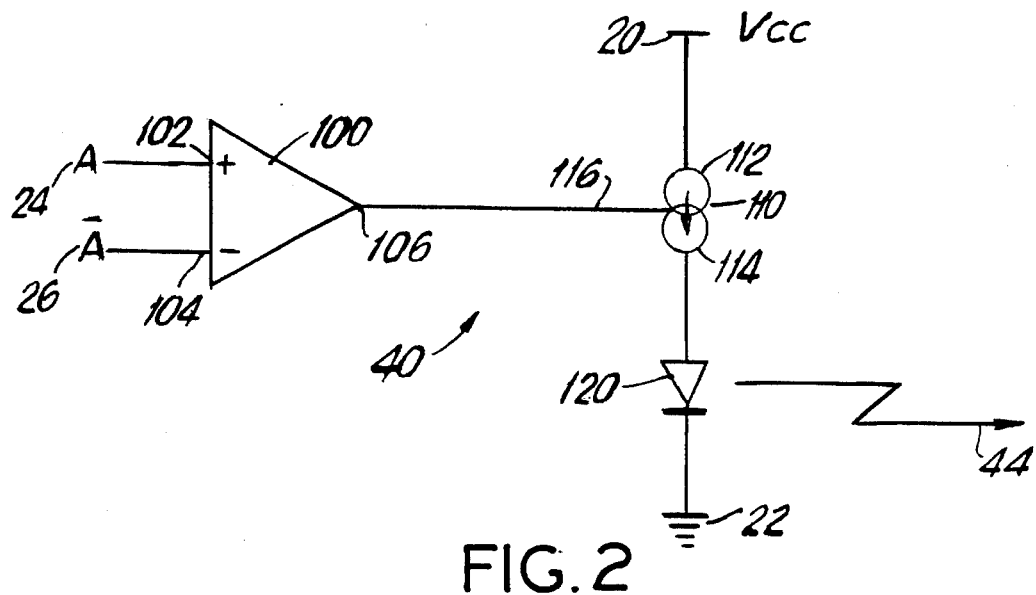
FIG. 2 is an electrical schematic diagram of an input differential amplifier circuit for the line receiver of FIG. 1.

An electrical schematic diagram for the input differential amplifier circuit 40 for the line receiver 10 is shown in FIG. 2. The amplifier circuit 40 comprises a differential amplifier 100 having a non-inverting input 102, an inverting input 104, and an output 106. The amplifier circuit 40 also comprises a switched current source 110 having a voltage source input 112, an output 114, and a control input 116. The amplifier circuit 40 further comprises a light emitter 120, which may be a low or high speed light emitting diode ("LED"), that emits optical radiation when driven to the "on" state (i.e., is conducting).

The non-inverting input 102 of the differential amplifier 100 is connected to the first differential data input 24 of the receiver DIP 12 and the inverting input 104 is connected to the second differential data input 26. The output 106 of the differential amplifier 100 is connected to the control input 116 of the switched current source 110. The voltage source input 112 of the current source 110 is connected to the voltage supply $V_{CC}$ (via the first voltage supply pin $V_{CC1}$ 20 of the receiver DIP 12) and the output 114 of the current source 110 is connected to the emitter 120. The emitter 120, in turn, is connected to ground (via the first ground pin $GND_1$ 22 of the receiver DIP 12). Depending on the relative values of the signals received by the differential data inputs 24, 26, the output 106 of the amplifier 100 causes the current source 110 to vary its current output, thus varying the amount of optical radiation generated by the emitter 120.

Figure 3:
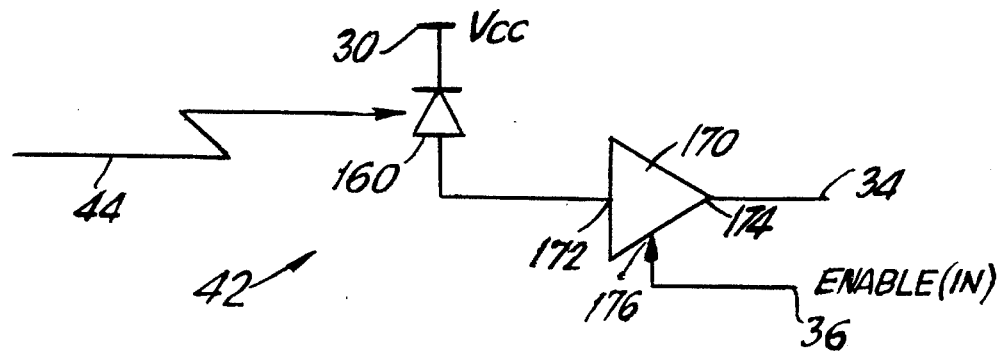
FIG. 3 is an electrical schematic diagram of a differential output circuit for the line receiver of FIG. 1.

The optical radiation generated by the emitter 120 is directed across the optical cavity 44 to the differential output circuit 42 illustrated in FIG. 3. The output circuit 42 comprises a photodetector 160 and a single-ended amplifier 170 having an input 172, an output 174, and an enable input 176. The photodetector 160 is connected between the voltage supply $V_{CC}$ (via the second voltage supply pin $V_{CC2}$ 30) and the input 172 of the single-ended amplifier 170. The output 174 of the single-ended amplifier 170 is connected to the data output 34 of the receiver DIP 12 and the enable input 176 is connected to the enable output 36. Note that the output circuit 42 may take on a differential design rather than the single-ended design illustrated in the figure.

In operation, the line receiver 10 is connected to a data communications line and functions as an interface between respective driving and receiving data circuitry. The receiver DIP 12 may be soldered or otherwise connected to a printed circuit board that contains the data circuitry or circuitry that connects to the data circuitry. The input differential amplifier circuit 40, and in particular the non-inverting and inverting inputs 102, 104 of the differential amplifier 100, receives two input signals A and $\overline{A}$ from the driving data circuitry via the first and second differential data inputs 24, 26 of the receiver DIP 12. The resulting output signal from the differential amplifier 100, which is dependent upon the values of the two input signals A and $\overline{A}$, swings between the supply voltage $V_{CC}$ and ground. The output 106 of the differential amplifier 100 controls the switched current source 110 to drive the emitter 120 either to the on state (i.e., conducting) or to the off state (i.e., not conducting). Thus, the state of the emitter 120 depends on the values of the two input signals A and $\overline{A}$.

When the current source 110 drives the emitter 120 on, the emitter 120 generates optical radiation. The optical radiation is directed across the optical cavity 44 and received by the photodetector 160 of the differential output circuit 42. The optical radiation impinges on the photodetector 160 which, in response thereto, drives the single-ended amplifier 170. The resulting output from the single-ended amplifier 170 is transmitted to the receiving data circuitry (via the data output 34 of the receiver DIP 12) upon receiving the appropriate enable signal from the receiving data circuitry. Note that the enable signal is transmitted to the enable input 176 of the single-ended amplifier 170 via the enable output 36 of the receiver DIP 12.

When the current source 110 drives the emitter 120 off, the emitter 120 does not generate any optical radiation. As a result, the photodetector 160 does not drive the single-ended amplifier 170 and the receiving data circuitry receives no signal.

While there has been described what is believed to be the preferred embodiment of the invention, those skilled in the art will recognize that other and further modifications may be made thereto without departing from the spirit of the invention, and it is intended to claim all such embodiments that fall within the true scope of the invention. For example, although the embodiment shown here has only two inputs, for a possible total of four states, the invention is not limited to two inputs or four states and can handle any number of inputs and states.

What is claimed is:

1. A self-contained apparatus for optically isolating at least one discrete input from at least one discrete output, comprising:

input means, responsive to an input electrical signal having two predetermined electrical states, for generating an optical signal having two corresponding optical levels; and output means, responsive to the optical signal generated by the input means, for generating an output electrical signal having a plurality of states, where at least two of the states correspond to the two predetermined electrical states of the input electrical signal.

2. The apparatus as set forth in claim 1, wherein the input means includes a single optical emitter.

3. The apparatus as set forth in claim 1, wherein the input electrical signal is a differential signal.

4. The apparatus as set forth in claim 1, further including enabling means for enabling a high-impedance output state in the output means.

5. The apparatus as set forth in claim 1, wherein the input means includes means for converting the input electrical signal to a single-ended signal.

6. The apparatus as set forth in claim 1, wherein the input means includes a single optical emitter and control means for switching current flowing through the emitter between two levels.

7. A system, comprising:

means for conveying signals; and isolation means for optically isolating at least one discrete input from at least one discrete output and receiving signals from the means for conveying, the isolation means having:

input means, responsive to an input electrical signal having two predetermined electrical states, for generating an optical signal having two corresponding optical levels; and output means, responsive to the optical signal generated by the input means, for generating an output electrical signal having a plurality of states, where at least two of the states correspond to the two predetermined electrical states of the input electrical signal.

8. The system as set forth in claim 7, wherein the input means includes a single optical emitter.

9. The system as set forth in claim 7, wherein the input electrical signal is a differential signal.

10. The system as set forth in claim 7, further including enabling means for enabling a high-impedance output state in the output means.

11. The system as set forth in claim 7, wherein the input means includes means for converting the input electrical signal to a single-ended signal.

12. The system as set forth in claim 7, wherein the input means includes a single optical emitter and control means for switching current flowing through the emitter between two levels.

13. A method for optically isolating at least one discrete input from at least one discrete output, comprising the steps of:

in response to an input electrical signal having two predetermined electrical states, generating an optical signal having two corresponding optical levels; and in response to the optical signal, generating an output electrical signal having a plurality of states, where at least two of the states correspond to the two predetermined electrical states of the input electrical signal.

14. The method as set forth in claim 13, wherein the optical signal is generated by a single optical emitter.

15. The method as set forth in claim 13, wherein the optical signal is generated in response to a differential signal.

16. The method as set forth in claim 13, further including the step of enabling a high-impedance output state.

17. The method as set forth in claim 13, wherein the step of generating an optical signal includes the step of converting the input electrical signal to a single-ended signal.

18. The method as set forth in claim 13, wherein the step of generating an optical signal includes the step of switching currents between two levels.

* * * * *